3,578,465
Patented May 11, 1971

3,578,465
FLAVOURING COMPOSITIONS
Antonie Simon Maria van der Zijden, deceased, late of Duiven, Netherlands, by Regina Christina Maria van der Zijden-Willemse, legal representative of the heirs, Duiven, Netherlands, assignor to Lever Brothers Company, New York, N.Y.
No Drawing. Filed May 22, 1968, Ser. No. 731,338
Claims priority, application Netherlands, May 25, 1967, 6707232
Int. Cl. A23l 1/22
U.S. Cl. 99—140                           21 Claims

ABSTRACT OF THE DISCLOSURE

An artificial flavouring composition comprising pyrrolidone carboxylic acid or a precursor thereof such as glutamine and succinic acid. The weight ratio of the acids, calculated as the free acid, is pyrrolidone carboxylic acid 1 part to succinic acid 0.01 up to 5 parts. The compositions can also include glutamic acid and then the weight ratio, of pyrrolidone carboxylic acid to glutamic acid is 1 to 0.02 up to 50 parts, and may also include a 5′-ribonucleotide, the weight ratio of pyrrolidone carboxylic acid to 5′-ribonucleotide being 1 to 0.01 up to 10 parts.

---

The invention relates to a process of preparing artificial flavouring compositions having a meaty taste, and to artificial flavouring compositions.

The meaty taste of many commercially available foodstuffs, such as soups, gravies and preserved meals, is often obtained by incorporating during their preparation a product which is known in trade as a meat extract, herein referred to as "commercial meat extract." This product, however, which is normally obtained by water extraction of meat, particularly beef, followed by evaporation of the greater part of the water, has various drawbacks. In the first place, owing to the costly and time-consuming method of preparation it is not only relatively expensive, but its quality is not very constant, and after dilution with water its taste is different from that of broth or gravy directly prepared from meat.

In the preparation of foodstuffs having a meaty taste attempts have been made to replace this commercial meat extract partly or completely by artificial flavouring compositions. The components of such flavouring compositions include compounds which either as such or in combination have a taste approximating that of meat extracts or of meat-containing foodstuffs.

Such artificial flavouring compositions are used both in the preparation of concentrates (such as "powdered flavour," gravy cubes, gravy powder and concentrated soup) which by dilution with other food-grade ingredients can be processed into ready-for-use foodstuffs having a meaty taste, and in the industrial preparation of foodstuffs which are ready for use (such as soup and preserved meals).

Although such artificial flavouring compositions are in the first place used for obtaining and/or improving tastes corresponding with those of meat originating from warm-blooded animals, they can also be used for obtaining and/or improving tastes corresponding with those of meat originating from other animals, such as fish (e.g. tunny), crustaceans (e.g. lobster), shell-fish (e.g. mussels).

In the following specification, therefore, by artificial flavouring compositions having a meaty taste are understood, besides concentrates, also ready-for-use foodstuffs having a meaty taste, including those already containing meat and meat extracts, the term "meat" including meat originating from warm-blooded animals as well as that from other animals mentioned above. Examples of flavouring compositions according to the invention are artificial meat extract, "powdered flavour," gravy cubes or gravy powder, concentrated soup (in tins or in dry form), soup, lobster soup, preserved meals, preserved meat, such as tinned ham, preserved fish, such as tinned tunny, rissoles, "nasi goreng," potato chips, and the like.

Known components of such artificial flavouring compositions include: protein hydrolysates, single amino acids, particularly L-glutamino acid and/or a salt thereof, more particularly the monosodium salt (usually abbreviated to MSG) and nucleotides, particularly 5′ - ribonucleotides, such as guanosine-5′-monophosphate (5′-GMP), inosine-5′-monophosphate (5′-IMP) and adenosine-5′-monophosphate (5′-AMP). It has further been proposed to incorporate in such flavouring compositions succinic acid or a salt thereof. Although the flavouring compositions thus obtained possess a characteristic taste indeed, yet they do not always fulfill the purpose aimed at, as this taste or sometimes their aftertaste is often experienced as "sharp."

Thus, the taste of flavouring compositions containing glutamic acid and/or 5′-ribonucleotides but in particular of compositions containing succinic acid can be rounded and made milder by combining these acids or their corresponding salts with pyrrolidone carboxylic acid.

Accordingly the present invention provides an artificial flavouring composition comprising pyrrolidone carboxylic acid and succinic acid in which the weight ratio of the acids, calculated as free acids, is pyrrolidone carboxylic acid 1 part to succinic acid 0.01 up to 5 parts.

A preferred ratio to 1 part of pyrrolidone carboxylic acid to 0.02 up to 1 part of succinic acid.

These flavouring compositions of this invention can also usefully contain glutamic acid in which case the weight ratio of pyrrolidone carboxylic acid to glutamic acid, calculated as the free acid, is 1 part pyrrolidone carboxylic acid to 0.02 up to 50 parts of glutamic acid, preferably 1 to 0.25 up to 25 parts.

Flavouring compositions according to this invention can also contain 5′-ribonucleotides together with the pyrrolidone carboxylic acid and succinic acid and, optionally, glutamic acid, the weight ratio, calculated as free acid, is 1 part of pyrrolidone carboxylic acid to 0.01 up to 10 parts of 5′-ribonucleotide, preferably 1 part to 0.03 up to 5 parts.

Since the present invention relates to flavouring compositions for use in both concentrated and ready-for-use foodstuffs, it is not possible to indicate absolute concentration ranges applying to all flavouring compositions. For a ready-for-use foodstuff, such as soup, broth, ragout and nasi goreng, it is generally desirable to employ such concentrations that the amount of pyrrolidone carboxylic acid (calculated as free acid) is 0.01–10, preferably 0.1–3 g./kg. For concentrated flavouring compositions, such as liquid or solid "sprinkling flavour," gravy cubes or gravy powder and concentrated soup (in tins or in dry form), which by dilution with other food-grade components can be converted into a ready-for-use foodstuff, it is generally desirable to choose such a concentration of pyrrolidone carboxylic acid that after addition of the flavouring composition or processing it to ready foodstuffs for use the concentration obtained therein corresponds with the aforesaid concentration of 0.01–10, preferably 0.1–3 g./kg.

Pyrrolidone carboxylic acid contains an asymmetric carbon atom hence 2 optical antipodes exist. The L-pyrrolidone carboxylic acid has particularly favourable taste-modifying characteristics, so that in the preparation of artificial flavouring compositions according to the invention it is prferred to use this compound or precursors thereof.

Although it is preferred to incorporate in these flavour compositions pyrrolidone carboxylic acid as such, it may also be partly or completely replaced by a compound acting as precursor, i.e. a compound which under the conditions applied during preparation of the ready-for-use foodstuff with or from the flavouring composition is converted to a considerable degree, preferably for more than 20%, into pyrrolidone carboxylic acid, which eventually also leads to the above result. An example of such a precursor is glutamine.

When the pyrrolidone carboxylic acid is partly or completely replaced by a precursor, such as glutamine, such an amount thereof is taken, that the weight ratio of the pyrrolidone carboxylic acid present in the ready-for-use products will fall within the above given limits, both in relation to the other aforementioned flavouring compounds (succinic acid, glutamic acid and 5'-ribonucleotides) and in relation to the ready-for-use product.

The pyrrolidone carboxylic acid is a well known compound, which in an aqueous medium is in equilibrium with glutamic acid. The factors which are of importance with respect to this equilibrium have been the subject of extensive investigations, in which it was found, inter alia, that ring closure is complete at pH 7. The rate of reaction of this ring closure reaction is, however, very slow at this pH. Thus, on heating glutamic acid in an aqueous medium at pH 7 at 100° C. for 2-3 hrs. only about 1% of this product is converted into pyrrolidone carboxylic acid. Further, pyrrolidone carboxylic acid can be formed by ring closure of glutamine with splitting off of ammonia, which ring closure proceeds far more rapidly.

Although in the literature many investigations have been described with regard to the substances occurring in meat and meat extracts which might contribute to the taste of these products, which investigations were usually based on sensitive methods of separation and identification, there is not a single case in which mention is made of pyrrolidone carboxylic acid as component of meat extracts.

Neither does the literature contain any description of artificial flavouring compositions with a meaty taste comprising pyrrolidone carboxylic acid as taste-modifying agent.

It is known indeed that pyrrolidone carboxylic acid is found in a number of products of vegetable origin. Among other things, it forms a component of certain Japanese soybean sauces. Furthermore, a number of authors associate the so-called "off-flavour" of certain foodstuffs of vegetable origin with their content of pyrrolidone carboxylic acid. It appears that the compound is found in a number of sterilised products (beets, tomatoes, maize and cherries), whereas in fresh condition these products do not contain pyrrolidone carboxylic acid or contain it in a much lower concentration. In this connection it could be shown that under the influence of the sterilisation conditions employed the acid was formed from glutamine, whereas the glutamic acid was not converted under these conditions into pyrrolidone carboxylic acid.

It has been suggested in the literature to employ the hygroscopic properties of the salts of pyrrolidone carboxylic acid by adding these salts as agents for promoting moisture retention to products which tend to lose moisture when exposed to the air, such as cosmetics, emulsions and foodstuffs; in order to produce the desired effect these products should then contain at least 2, but preferably 4 to 10% by wt. of such a salt.

On the basis of the properties of pyrrolidone carboxylic acid described above, it is very surprising that this product can be applied as taste-modifying agent in flavouring compositions having a meaty taste.

Further, certain limitations should be made with respect to artificial flavouring compositions with a meaty taste to which glutamic acid or MSG, respectively, have been added as the flavouring component. Although, as stated before, in the sterilisation of vegetable foodstuffs containing glutamic acid no conversion of this product into pyrrolidone carboxylic acid can be established, it should still be taken into account, on the basis of the chemical properties of the said product, that such a conversion takes place, be it for a small percentage up to maximum of 2%. However, from taste tests it has appeared that in artificial flavouring compositions containing glutamic acid in combination with pyrrolidone carboxylic acid no taste improving effect can be established if the amount of pyrrolidone carboxylic acid is less than 2% by wt. of the glutamic acid present. So, as far as heating (e.g. for sterilisation purposes) would lead to the formation of pyrrolidone carboxylic acid, the amount of this acid is insufficient to produce the desired effect, so that for such glutamic acid containing flavouring compositions it remains necessary to add pyrrolidone carboxylic acid. For clarity's sake therefore, it is stated that the invention includes neither processes nor flavouring compositions in which the pyrrolidone carboxylic acid exclusively originates from glutamic acid.

If desired, other components than those already mentioned above may be incorporated in the flavouring compositions according to the invention. The first of such components to be considered are kitchen-salt, carboxylic acids other than those already mentioned, such as lactic acid and malic acid, and amino acids other than glutamic acid. By amino acids are understood here the building stones of proteins, such as alanine, histidine, arginine, threonine, methionine and leucine. As regards the mutual ratio of these amino acids the aim is preferably to approach an amino acid composition such as that of meat broth.

The amino acid mixtures to be used for carrying out the invention can be obtained in a simple way by hydrolysis, autolysis or fermentation, or combinations thereof, of vegetable or animal proteins such as soybean protein, gluten, casein and yeast, or of extracts of these products.

Further compounds or classes of compounds which can be applied advantageously in the flavouring compositions according to the invention are the following:

(1) Amino acids such as homo-cysteine acid, ornithine, oxyproline and β-hydroxy-glutamic acid.

(2) Peptides, such as alanyl-alanine, alanyl-phenylalanine, alanyl-asparagine, carnosine and anserine.

(3) 5'-ribonucleotides other than those already mentioned above, such as xanthose-5'-monophosphate (5'-XMP), uridine-5'-monophosphate (5'-UMP), cytidine-5'-monophosphate (5'-CMP), as well as their amides, desoxy derivatives.

(4) Artificial sweetening substances.

(5) Substances having the flavour of meat or broth, particularly sulphur containing compounds, such as compounds obtained by reaction of amino acids like cysteine/cystine with reducing sugars, ascorbic acid and the like, reaction products of hydrogen sulphide with lower aliphatic aldehydes or ketones (e.g. propion aldehyde, croton aldehyde, methional, mercaptoacetaldehyde).

(6) Other volatile sulphur compounds, such as $H_2S$, mercaptans, disulphides and sulphides, such as dimethyl sulphide and diallyl sulphide.

(7) Guanidines, such as creatine and creatinine.

(8) Salts, such as phosphates, particularly, in connection with the pH, so-called acid phosphate like $Na_2HPO_4$, $NaH_2PO_4$ or other alkali or ammonium phosphates and organic phosphates, such as phosphorus containing amino acids.

(9) Nitrogen compounds, such as ammonia, amines, urea and the like.

(10) Saturated or unsaturated carboxylic acids having 2–12 carbon atoms.

(11) Saturated or unsaturated higher hydroxycarboxylic acids and γ- and δ-lactones, derived therefrom, such as deca- and dodeca-5-olides and 2,3-dimethyl-2,4-alkadiene-4-olides.

(12) Lower saturated and unsaturated aldehydes, e.g. acetaldehyde; propion aldehyde, isobutyraldehyde and hepten-4-al.

(13) Lower saturated and unsaturated ketones, such as acetone, butanone and di-acetyl.

(14) Tricholominic acid and ibotenic acid or their salts.

(15) Aromatic or non-aromatic carbocyclic and/or heterocyclic compounds, such as ortho amino-acetophenone, N-acetonyl pyrrole, indole, skatole, maltol, isomaltol, ethyl maltol, lanthionine, hypoxanthine, guanine, inosine and guanosine.

(16) Lower saturated and unsaturated alcohols, such as ethanol, glycerol and octenol.

(17) Colouring substances, such as curcuma.

(18) Thickening agents such as gelatin and starch.

The dosage of these optional ingredients depends on the kind of flavour one wishes to imitate and further on the nature of the foodstuff to which it is added and the other ingredients incorporated in it, such as herbs and spices.

The flavouring composition according to the invention may be prepared simply in solution or in the form of a paste. It is also possible to prepare a granulated, powdered or tablet-shaped product by using fillers such as kitchen salt, starch and gelatin. Further, it is possible to coat the powdered or granulated product with a substance such as fat.

The invention will now be illustrated by the following examples:

The L-pyrrolidone carboxylic acid used in the examples possessed the following characteristics:

Melting point: 160–162° C.
Optical rotation $[\alpha]_D^{20}$: −10.7° (C.=6; $H_2O$).

EXAMPLE 1

Two solutions were prepared by dissolving the following ingredients in water:

|  | Solution G, g. | Solution H, g. |
| --- | --- | --- |
| Sodium chloride | 1.0 | 1.0 |
| Lactic acid | 4.0 | 4.0 |
| Succinic acid | 0.20 | 0.20 |
| L-pyrrolidone carboxylic acid | | 2.0 |

The pH of these solutions was adjusted at 5.5 and subsequently both solutions were diluted to 1 litre. After heating to 55° C. the taste of both solutions was judged by 29 persons. The taste of solution H was preferred by 20 persons.

EXAMPLE 2

Two solutions were prepared by dissolving the following ingredients in water:

|  | Solution K, g. | Solution L, g. |
| --- | --- | --- |
| Sodium chloride | 1.0 | 1.0 |
| 5′-IMP | 0.15 | 0.15 |
| 5′-GMP | 0.15 | 0.15 |
| Lactic acid | 8.0 | 8.0 |
| Succinic acid | 0.20 | 0.20 |
| L-pyrrolidone carboxylic acid | | 2.0 |

The pH of these solutions was adjusted to 5.5 and subsequently both solutions were diluted to 1 litre. After heating to 55° C. the taste of both solutions was judged by 28 persons. The taste of solution L, more resembling that of broth, was preferred by 23 persons.

EXAMPLE 3

Two solutions were prepared by dissolving the following ingredients in water:

|  | Solution O, g. | Solution P, g. |
| --- | --- | --- |
| Sodium chloride | 1.0 | 1.0 |
| 5′-IMP | 0.20 | 0.20 |
| Lactic acid | 7.0 | 7.0 |
| Monosodium glutamate | 2.0 | 2.0 |
| Succinic acid | 0.20 | 0.20 |
| L-pyrrolidone carboxylic acid | | 2.0 |

The pH of both solutions was adjusted to 5.5 and subsequently both solutions were diluted to 1 litre. After heating to 55° C. the taste of both solutions was judged by 28 persons. The fuller taste of solution P, a taste more resembling that of broth, was preferred by 22 persons.

EXAMPLE 4

Two flavouring solutions were prepared by dissolving the following ingredients in water:

|  | Solution Q, g. | Solution R, g. |
| --- | --- | --- |
| Sodium chloride | 1.0 | 1.0 |
| 5′-IMP | 0.20 | 0.20 |
| 5′-GMP | 0.15 | 0.15 |
| Monosodium glutamate | 0.5 | 0.5 |
| Succinic acid | 0.20 | 0.20 |
| Casein hydrolysate | 0.50 | 0.50 |
| Pyrrolidone carboxylic acid | | 2.5 |

Both solutions were adjusted to pH 5.7, supplemented to 1 litre and subsequently heated up to 55° C. A panel of 18 persons unanimously preferred the taste of solution R.

EXAMPLE 5

Two solutions were prepared by dissolving the following ingredients in water:

|  | Solution S, g. | Solution T, g. |
| --- | --- | --- |
| Sodium chloride | 1.0 | 1.0 |
| 5′-IMP | 0.20 | 0.20 |
| 5′-GMP | 0.10 | 0.10 |
| Monosodium glutamate | 0.5 | 0.5 |
| Lactic acid | 5.0 | 5.0 |
| Succinic acid | 0.10 | 0.10 |
| Phosphoric acid | 1.5 | 1.5 |
| Casein hydrolysate | 0.5 | 0.5 |
| L-pyrrolidone carboxylic acid | | 2.0 |

The pH of these solutions was adjusted to 5.5 and subsequently these solutions were diluted to 1 litre. After heating to 55° C. the taste of both solutions was judged by 27 persons. Of this panel 21 persons preferred the taste, more resembling that of broth, of solution T.

EXAMPLE 6

A soup base was prepared by mixing the following ingredients and diluting them with water to 2 litres:

|  | G. |
| --- | --- |
| Sodium chloride | 13.0 |
| Lard | 12.0 |
| Onion powder | 3.0 |
| Celery salt | 2.0 |
| Casein hydrolysate | 2.0 |
| Dried parsley | 0.20 |
| Curcuma | 0.04 |
| Pepper | 0.12 |
| Laurel powder | 0.06 |
| Mace | 0.04 |

Two flavouring solutions were prepared by dissolving the following substances in water:

|  | Solution 1, g. | Solution 2, g. |
| --- | --- | --- |
| Succinic acid | 2.5 | 2.5 |
| L-pyrrolidone carboxylic acid | | 25.0 |

The pH of both solutions was adjusted to 6.0, after which both solutions were diluted to 1 litre. Subsequently, two test samples were prepared by adding to 1 litre of the soup base described above 10 ml. of solution 1 and solution 2, respectively. After cooking for 10 minutes the two test samples were appreciated by a panel of 18 persons. The fuller taste of the sample containing solution 2 was preferred by 15 persons of the panel.

EXAMPLE 7

A soup base was prepared by mixing the following ingredients and diluting them with water to 4 litres:

|  | G. |
|---|---|
| Sodium chloride | 24.0 |
| Casein hydrolysate | 7.0 |
| Monosodium glutamate | 4.0 |
| Gistex (spray-dried) | 8.0 |
| Curcuma | 0.08 |
| Onion powder | 2.0 |
| Parsley (dried) | 0.2 |
| Seasonings for soup | 0.25 |

At the same time two flavouring solutions were prepared by dissolving the following substances in water:

|  | Solution 3, g. | Solution 4, g. |
|---|---|---|
| Sodium chloride | 10.0 | 10.0 |
| 5'-IMP | 2.0 | 2.0 |
| Lactic acid | 15.0 | 15.0 |
| Casein hydrolysate | 8.0 | 8.0 |
| Succinic acid | 0.3 | 0.3 |
| L-pyrrolidone carboxylic acid |  | 4.0 |

The pH of these solutions was adjusted to 6.0, after which both solutions were diluted to 1 litre. Subsequently two test samples were prepared by adding to 2 litres of the above soup base 200 ml. solution 3, and 200 ml. solution 4, respectively. After cooking for 10 minutes the samples were tasted in a triangle-test by 24 persons. Of this panel 15 persons correctly recognized the deviating sample.

EXAMPLE 8

A flavouring composition was prepared by dissolving the following ingredients in water:

|  | G. |
|---|---|
| NaCl | 10.0 |
| Casein hydrolysate | 10.0 |
| Monosodium glutamate | 10.0 |
| Lactic acid | 15.0 |
| Succinic acid | 0.4 |
| Fumaric acid | 0.5 |
| L-pyrrolidone carboxylic acid | 4.0 |
| 5'-IMP | 0.6 |
| 5'-GMP | 0.4 |
| Taurine | 1.0 |
| Carnosine | 2.5 |

The pH of this solution was adjusted at 5.5 and the volume was made up to 1 litre. This solution will be referred to as solution 5.

A gravy base was prepared from the following ingredients:

|  | G. |
|---|---|
| Gelatine | 4.0 |
| Curcuma | 0.1 |
| NaCl | 6.0 |
| Carrot powder | 1.0 |
| Onion powder | 1.0 |
| Tomato purée | 5.0 |
| Clove powder | 0.3 |
| Laurel powder | 0.04 |
| Pepper | 0.06 |
| Casein hydrolysate | 1.0 |
| Tallow | 15.0 |

Water 1.0 l.

The gelatin was soaked in part of the water. The rest of the water was heated and mixed with the other ingredients. Finally the gelatine solution was added.

To 1 litre of the above gravy base 100 ml. of solution 5 was added. A second gravy was prepared by adding to 1 litre of the gravy base 5 g. meat extract, dissolved in 100 ml. water. After cooking for 10 minutes both gravy samples were organoleptically appreciated by a panel of 26 persons. Of this panel 19 persons preferred the gravy prepared with solution 5.

A third gravy, composed of 1 litre of gravy base, 2 g. meat extract dissolved in 50 ml. water and 50 ml. of solution 5, was compared in an analogous way with the second gravy, composed of the gravy base and 5 g. meat extract. It then appeared that also the partial replacement of meat extract by the flavouring composition resulted in a product which a test panel preferred to the second gravy, in which nothing of the meat extract had been replaced.

EXAMPLE 9

A ragout base was composed of the following ingredients:

|  | G. |
|---|---|
| Margarine | 40.0 |
| Flour | 40.0 |
| Water | 400.0 |
| Pepper | 0.01 |
| Monosodium glutamate | 1.5 |
| Curcuma | 0.02 |
| NaCl | 2.5 |
| Veal | 20.0 |

The molten margarine was mixed with the flour and the mixture obtained was stirred up with the heated water. The sauce was finished with the remaining ingredients. The meat was added to this mixture in a finely divided and well-done form.

At the same time two flavouring solutions were prepared by dissolving the undermentioned substances in water:

|  | Solution 6, g. | Solution 7, g. |
|---|---|---|
| Succinic acid | 1.0 | 1.0 |
| L-pyrrolidone carboxylic acid |  | 12.0 |

The pH of both solutions was adjusted to 5.8 and their volume was made up to 250 mls. in each case.

To the ragout base described 25 ml. of solution 6 and 25 ml. of solution 7, respectively, were added per 500 g. of ragout base. After heating, both ragouts were organoleptically judged by a panel of 22 persons. Of this panel 17 persons preferred the ragout prepared with solution 7.

EXAMPLE 10

Nasi goreng was prepared with the following ingredients:

|  | G. |
|---|---|
| Rice | 200.0 |
| Sodium chloride | 8.0 |
| Sambal | 1.2 |
| Casein hydrolysate | 1.5 |
| Pork | 50.0 |
| Red paprika | 20.0 |
| Onions (cut) | 200.0 |
| Lard | 15.0 |
| Water | 400.0 |

The rice was cooked for 25 minutes in water with salt. In a frying pan the meat was fried in the fat, after which the onions, paprika, sambal and casein hydrolysate were added. All this was well mixed and fried until the onions had obtained a golden colour. Subsequently, the rice was added and fried with constant stirring.

To this nasi 40 ml. of a flavouring composition were added which had been obtained by dissolving the undermentioned ingredients in water:

|  | G. |
|---|---|
| Casein hydrolysate | 10.0 |
| Lactic acid | 60.0 |
| 5'-GMP | 1.0 |
| 5'-IMP | 1.5 |
| L-pyrrolidone carboxylic acid | 12.0 |
| Succinic acid | 1.0 |

The pH of this solution was adjusted at 5.5 and subsequently the volume was made up to 1 litre (solution 8).

A panel of 18 testers unanimously preferred the nasi with the flavouring composition 8, on account of its being full flavoured and having a more meaty taste.

EXAMPLE 11

A powdered flavouring composition, suitable as sprinkling flavour, was obtained by spray-drying a 35% solution, containing NaCl, sodium lactate and dextrine maltose in a ratio of 3.5:2:1.

To 110 g. of the powder thus obtained the following substances were added:

| | G. |
|---|---|
| NaCl | 10.0 |
| Casein hydrolysate | 10.0 |
| 5'-IMP | 1.5 |
| 5'-GMP | 1.0 |
| Monosodium glutamate | 10.0 |
| L-pyrrolidone carboxylic acid Na salt | 6.0 |
| Succinic acid | 0.6 |
| Creatine | 6.0 |
| Taurine | 3.0 |
| $Na_2HPO_4 \cdot 2H_2O$ | 1.6 |

A panel of 19 testers found that the addition of this flavouring composition, as a sprinkling flavour, to a soup already served improved the taste of this soup.

EXAMPLE 12

A powdered flavouring composition was prepared by mixing 450 g. 60% sodium lactate solution with 700 g. potato starch. After setting of the mixture it was dried and ground. To 500 g. of the powder obtained the following substances were added:

| | G. |
|---|---|
| Casein hydrolyste | 40.0 |
| 5'-GMP | 3.0 |
| 5'-IMP | 3.5 |
| Succinic acid | 2.5 |
| NaCl | 40.0 |
| Malic acid | 1.0 |
| L-pyrrolidone carboxylic acid Na salt | 30.0 |
| Taurine | 5.0 |
| Creatine | 7.0 |

The mixture was thoroughly mixed and ground once more.

A dry soup was prepared by mixing 80 g. of the above pulverized flavouring composition with the following ingredients:

| | G. |
|---|---|
| Casein hydrolysate | 25.0 |
| Monosodium glutamate | 5.0 |
| Sodium chloride | 60.0 |
| Lard | 50.0 |
| Dried beef (cut) | 60.0 |
| Curcuma | 0.2 |
| Parsley | 2.0 |
| Celery salt | 5.0 |
| Thyme | 0.2 |
| Mace | 0.2 |
| Clove powder | 0.2 |
| Laurel powder | 0.2 |
| Onion powder | 10.0 |
| Vermicelli | 50.0 |

A soup was prepared by cooking 35 g. of the mixture thus obtained with 1 litre water for 10 minutes. On organoleptic judgement this product was qualified as a good beef soup.

EXAMPLE 17

A soup base was prepared by incorporating the following ingredients in 1 litre water:

| | G. |
|---|---|
| Sodium chloride | 15.0 |
| Monosodium glutamate | 1.25 |
| Casein hydrolysate | 6.25 |
| Onion powder | 2.5 |
| Celery salt | 1.25 |
| Thyme | 0.05 |
| Mace | 0.05 |
| Clove powder | 0.05 |
| Laurel powder | 0.05 |
| Dried parsley | 0.5 |
| Curcuma | 0.07 |
| Gelatine | 2.5 |
| Lard | 12.5 |

A flavoring solution was prepared by dissolving the undermentioned ingredients in water:

| | G. |
|---|---|
| Sodium chlorine | 2.5 |
| Casein hydrolysate | 2.5 |
| L-pyrrolidone carboxylic acid | 3.5 |
| Succinic acid | 0.25 |
| Lactic acid | 20.0 |
| 5'-GMP | 0.6 |

The pH of this solution was adjusted to 5.7, after which the solution was supplemented to 1 litre.

A concentrated soup was prepared by adding to 400 ml. soup base 100 ml. of the flavouring solution. After a sterilisation process the soup was thus obtained was diluted with an equal volume of water (0.5 litre) and heated up to 55° C. to yield a ready-for-use product.

On organoleptic judgement this soup was qualified as very good.

If in the above-mentioned flavouring solution 3.5 g. L-pyrrolidone carboxylic acid were replaced by 4 L-glutamine, further test conditions being the same, also a soup of very good quality was obtained.

The L-glutamine used in this case possessed the following characteristics:

Melting point: 183°–184° C. (with decomposition)
Optical rotation $[\alpha]_D^{20}$: 31.8° (c.=7; 1.37 N hydrochloric acid).

What is claimed is:
1. An artificial flavouring composition comprising pyrrolidone carboxylic acid and succinic acid in which composition the weight ratio of the acids, calculated as the free acid, is pyrrolidone carboxylic acid 1 part to succinic acid 0.01 up to 5 parts.

2. An artificial flavouring composition as claimed in claim 1 in which the weight ratio of pyrrolidone carboxylic acid to succinic acid is 1 to 0.02 up to 1 part.

3. An artificial flavouring composition as claimed in claim 1 comprising, in addition to pyrrolidone carboxylic acid and succinic acid, glutamic acid in which composition the weight ratio, calculated as free acid, of pyrrolidone carboxylic acid to glutamic acid as 1 to 0.02 up to 50 parts.

4. An artificial flavouring composition as claimed in claim 3 in which the weight ratio of pyrrolidone carboxylic acid to glutamic acid is 1 to 0.25 up to 25 parts.

5. An artificial flavouring composition as claimed in claim 1 comprising, in addition to pyrrolidone carboxylic acid and succinic acid, a 5'-ribonucleotide, in which composition the weight ratio, calculated as free acid, of pyrrolidone carboxylic acid to 5'-ribonucleotide is 1 to 0.01 up to 10 parts.

6. An artificial flavouring composition as claimed in claim 5 in which the weight ratio of pyrrolidone carboxylic acid to 5'-ribonucleotide is 1 to 0.03 up to 5 parts.

7. An artificial flavouring composition as claimed in claim 3 comprising, in addition to pyrrolidone carboxylic acid, succinic acid and glutamic acid, a 5'-ribonucleotide in which composition, the weight ratio, calculated as free acid, of pyrrolidone carboxylic acid to 5′-ribonucleotide is 1 to 0.01 up to 10 parts.

8. An artificial flavouring composition as claimed in claim 7 in which the weight ratio of pyrrolidone carboxylic acid to 5′-ribonucleotide is 1 to 0.03 up to 5 parts.

9. An artificial flavouring composition as claimed in claim 1 in which at least part of the pyrrolidone carboxylic acid is in the form of a precursor.

10. An artificial flavouring composition as claimed in claim 3 in which at least part of the pyrrolidone carboxylic acid is in the form of a precursor.

11. An artificial flavouring composition as claimed in claim 5 in which at least part of the pyrrolidone carboxylic acid is in the form of a precursor.

12. An artificial flavouring composition as claimed in claim 7 in which at least part of the pyrrolidone carboxylic acid is in the form of a precursor.

13. An artificial flavouring composition as claimed in claim 9 in which the precursor is glutamine.

14. An artificial flavouring composition as claimed in claim 10 in which the precursor is glutamine.

15. An artificial flavouring composition as claimed in claim 11 in which the precursor is glutamine.

16. An artificial flavouring composition as claimed in claim 12 in which the precursor is glutamine.

17. An artificial flavouring composition as claimed in claim 1 in which the pyrrolidone carboxylic acid is L-pyrrolidone carboxylic acid.

18. A process of flavouring foodstuffs comprising incorporating into the foodstuff a quantity of an artificial flavouring composition as claimed in claim 1 such that a ready-for-use foodstuff will contain between 0.01 and 10 g. of pyrrolidone carboxylic acid per 1 kg. of ready-for-use foodstuff.

19. A process of flavouring foodstuffs comprising incorporating into the foodstuff a quantity of an artificial flavouring composition as claimed in claim 3 such that a ready-for-use foodstuff will contain between 0.01 and 10 g. of pyrrolidone carboxylic acid per 1 kg. of ready-for-use foodstuff.

20. A process of flavouring foodstuffs comprising incorporating into the foodstuff a quantity of an artificial flavouring composition as claimed in claim 5 such that a ready-for-use foodstuff will contain between 0.01 and 10 g. of pyrrolidone carboxylic acid per 1 kg. of ready-for-use foodstuff.

21. A process of flavouring foodstuffs comprising incorporating into the foodstuff a quantity of an artificial flavouring composition as claimed in claim 7 such that a ready-for-use foodstuff will contain between 0.01 and 10 g. of pyrrolidone carboxylic acid per 1 kg. of ready-for-use foodstuff.

References Cited

Shallenberger et al.: "Relationship Between Pyrrolidone Carboxylic Acid and An Off-Flavor in Beet Puree," Agricultural and Food Chemistry, vol. 6, No. 8, August (1958) pp. 604–606.

MORRIS O. WOLK, Primary Examiner

W. BOVEE, Assistant Examiner